United States Patent [19]

Artemov et al.

[11] 4,002,444
[45] Jan. 11, 1977

[54] VERTICAL SEPARATOR

[76] Inventors: Lev Nikolaevich Artemov, ulitsa Pravdy, 24a, kv. 44; Anatoly Fedorovich Bakanov, ulitsa Ordzhonikidze, 13, kv. 40; Anatoly Arkadievich Bilyavsky, ulitsa Entuziastov, 12, kv. 1; Vera Evdokimovna Gorodnitsyna, ulitsa Filippova, 4a, kv. 70, all of Podolsk; Evgenia Dmitrievna Elkina, ulitsa Lensoveta, 62, korpus 1, kv. 26, Leningrad; Valery Ivanovich Manaenkov, ulitsa Generala Ermolova, 4, kv. 5, Moscow; Ljudmila Nikolaevna Polyanskaya, ulitsa Mashinostroitelei 28 "b", kv. 58, Podolsk; Jury Leonidovich Sorokin, ulitsa Zapadnaya, 12, kv. 11, Leningrad; Anatoly Zakharovich Taran, ulitsa Entuziastov, 3, kv. 18, Pololsk; Evgeny Alexeevich Fadeev, Sevanskaya ulitsa, 7, korpus 1, kv. 64, Moscow, all of U.S.S.R.

[22] Filed: Apr. 2, 1975

[21] Appl. No.: 564,357

[52] U.S. Cl. .................................. 55/413; 55/320; 55/440; 55/DIG. 23; 122/34; 122/492; 122/488

[51] Int. Cl.² ........................................ B01D 45/04

[58] Field of Search ............................ 55/183–186, 55/188, 320, 442, 443, DIG. 23, DIG. 27, 440, 414, 413, 337, 344, 345, 418; 122/488, 492, 34

[56] References Cited

UNITED STATES PATENTS

| 1,110,461 | 9/1914 | Searle ............................. 55/442 X |
| 2,508,528 | 5/1950 | McPherson ...................... 55/185 X |
| 2,993,565 | 7/1961 | Coulter .......................... 55/DIG. 23 |
| 3,693,599 | 9/1972 | Andreev et al. ............... 122/488 X |
| 3,720,046 | 3/1973 | Kudirka et al. ........... 55/DIG. 23 X |

*Primary Examiner*—Frank W. Lutter
*Assistant Examiner*—David L. Lacey

[57] ABSTRACT

A vertical separator for liquid-gas media comprising a cylindrical housing accommodating a gas discharge pipe coaxial therewith, the pipe and the inner surface of the housing define an annular space divided by a partition wall with openings for gas passage into a liquid-gas space, and a gas space communicating with the internal space of the pipe. The liquid-gas space accommodates blocks for separating the media into liquid and gas, the blocks extending in the radial direction. Each separation block is provided with a gas discharge means accommodated in spaces between adjacent separation blocks and embracing the gas-passage openings in the partition wall.

4 Claims, 6 Drawing Figures

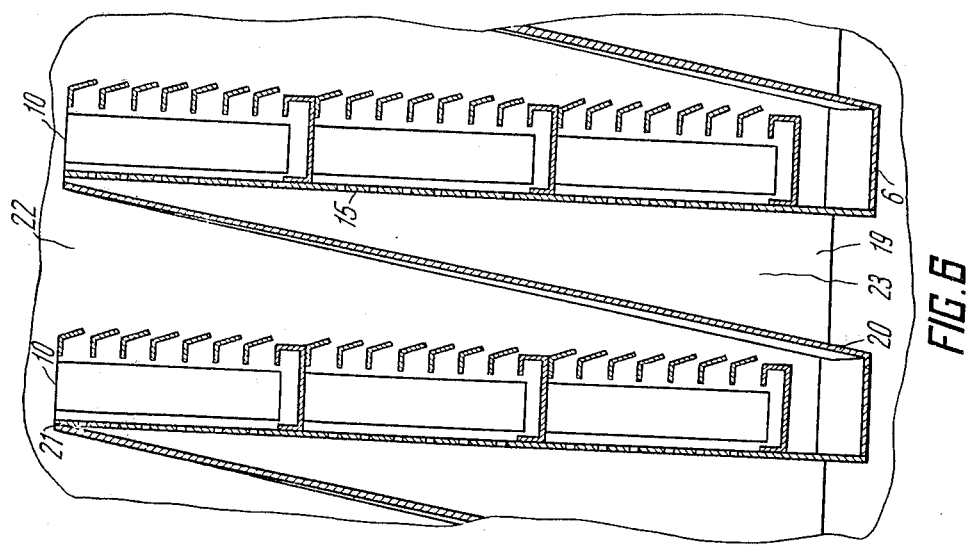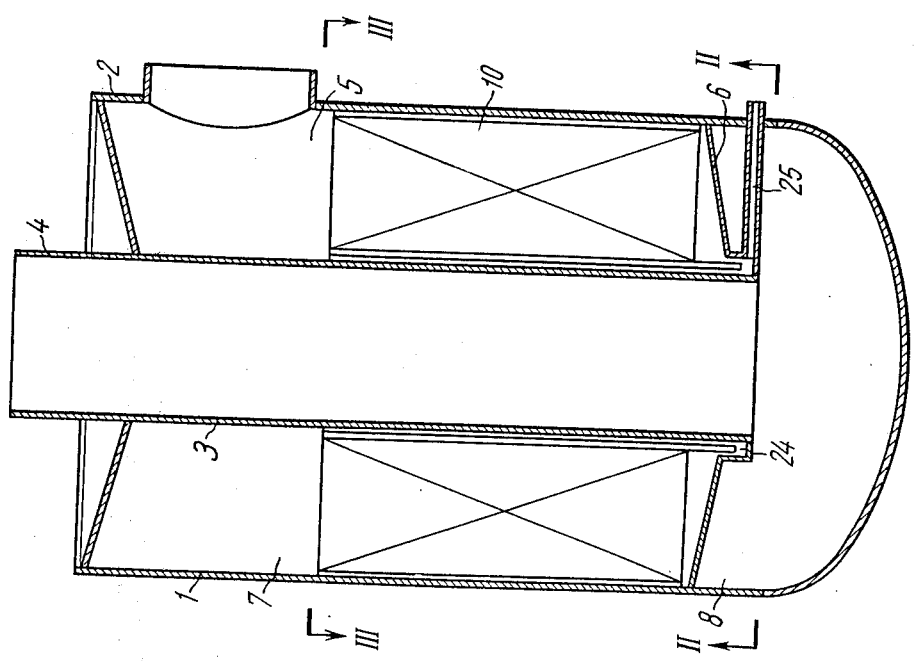

VERTICAL SEPARATOR

The present invention relates to the field of thermal power production, and more particularly, to vertical separators.

The present invention may be used for wet steam separation, e.g. in steam power plants with turbines using saturated steam as working medium, in the form of independent separators or as a component part of a separator-reheater inserted between high- and low-pressure cylinders of a steam turbine.

The invention may also be used in the chemical, petrochemical and other industries where a high grade of separation of liquid-gas media into phases is required.

Known in the art is a vertical straight steam separator comprising a cylindrical housing. The internal space of the housing is divided by a partition wall to define a wet steam space and a dry steam space. The wet steam space accommodates nozzles for primary rough cleaning, which are arranged along the axis of the housing. The nozzles are spaced apart to form passages for wet steam.

In the space defined between the inner surface of the housing and the outer surface of the nozzles there is provided a separation block vertically embracing all the nozzles. The separation block comprises a set of louvers which extend in the radial direction and define steam passages. In order to provide uniform loading of the louvers, the separation unit is enclosed in a perforated shell vertically embracing the entire unit.

During the operation of the steam separator, wet steam is fed to the nozzles at a high velocity. The separation of coarse mist takes place in the nozzles. The steam flowing in the nozzle passages changes its direction. Coarse mist falls down under the action of inertia and gravity. Then the wet steam flows at a low velocity to the louvers of the separation block. While flowing along the louver passages, fine mist is deposited on the louver walls and flows down due to repeated changes of the flow direction. The final separation of steam is thus completed.

It is a common knowledge that the throughput capacity of a separator depends on the surface area of the louvers. Therefore, the throughout capacity of the known separator is low due to a small surface area of the louvers.

The attempts to increase the throughput capacity of a separator resulted in the development of a vertical louver steam evaporator which has a cylindrical housing. The housing accommodates two partition walls somewhat spaced apart and mounted normally to the axis of the housing so as to divide the internal space of the housing into a wet steam space and a dry steam space. Separation blocks are concentrically accommodated in the space between the partition walls, each unit comprising a set of louvers defining steam passages. In order to provide for uniform loading of the louvers, each separation block is disposed along the entire height between two perforated shells. The separation blocks with the perforated shells are mounted in such a manner as to define annular steam passages. The annular passages delivering wet steam and discharging dry steam alternate in the radial direction. Each partition wall has openings for steam passage.

During the operation of the steam separator, wet steam is admitted through the passages in- the first partition wall in the direction of the wet steam flow to the annular delivery passages, and then, through the orifices in the perforated shells, the steam is admitted to the louvers of the adjacent separation block. Wet steam flows along the louver passages in which the mist is deposited on the louver walls due to repeated changes of the flow direction and flows down, while the dry steam escapes from the separation blocks through the orifices of the perforated shells and is admitted to the discharge annular passages.

In each annular passage, the axial velocity of steam and static pressure thereof vary along the height, thus resulting in non-uniform vertical loading of the louvers.

It is known that, in order to obtain an efficient operation of a separator, not only a low average velocity at the louvers should be provided (less than a critical velocity), but also a uniform velocity field should be obtained since a local increase in velocity (above the critical value) results in washing-off of the mist from the louvers which is inadmissible.

The known separator cannot provide for uniform velocity of steam and static pressure along the height of the separation block, that is there is no uniform velocity field because the cross-sectional areas of the annular passages for steam remain constant along the height of the separation unit. The steam velocity and static pressure vary along the height of the annular passage in the direction of the steam flow, which results in non-uniform vertical loading of the separation block, that is in a rather inefficient utilization of the separation surface since not only the average velocity but also the local steam velocities should be maintained below the critical values.

Therefore, non-uniform vertical loading of the separation unit results in a lower throughput capacity of the known steam separator.

Known in the art is a vertical louver separator.

This known separator comprises a cylindrical housing accommodating concentrically mounted separation blocks in the form of a set of louvers defining steam passages. In order to provide uniform vertical loading of the louvers, each separation block is provided, along the entire height at the steam inlet of the louvers, with guide vanes, and perforated plates are mounted at the steam outlet from the louvers.

The guide vanes are also used for preliminary separation of mist. In addition, in order to equalize the loading of the louvers, the space between the adjacent units is vertically divided by a conical partition wall. The space between the inner surface of the housing and the outer surface of the separation block at the side of the guide vanes also accommodates a conical partition wall concentrical with the housing, to equalize the loading of the louvers.

The space between the conical partition wall and the surface of the separation block, at the side of the guide vanes, forms a passage for feeding wet steam to the separation block. The space between the same conical partition wall and the surface of the adjacent separation block, at the side of the perforated plate, defines a passage for discharging dry steam from the adjacent separation block.

Each separation block has vertical sections for draining moisture deposited in the louvers and an annular collecting chamber mounted at the bottom under the separation block. Each section communicates with an annular collecting chamber.

The internal space of the housing is divided into wet and dry steam spaces by the top end faces of the separation blocks, the conical partition walls, the annular collecting chambers and the surfaces of the separation blocks at the sides of the perforated plates.

During the operation of the vertical louver separator, wet steam is admitted to the wet steam delivery passage in which almost constant axial velocity and static pressure of wet steam are maintained due to the vertically varying cross-sectional area. Then the steam is fed to the guide vanes to change the direction of flow from an axial to a radial direction towards the central zone of the separator. Thus about 50% of mist of the wet steam are separated which flows down into the annular collecting chambers. Then the wet steam is fed to the louvers.

It flows along the louver passages in which mist is deposited on the louver walls due to repeated changes of the flow direction and flows down along the vertical sections into the annular collecting chambers, and the steam dried in the louvers flows through the orifice in the perforated plate into the dry steam discharge passages where the steam changes its flow direction to an axial one. Almost constant axial velocity and static pressure of dry steam are maintained in the dry steam discharge passages due to a varying cross-sectional area thereof. Constant axial velocity and static pressure of steam in the delivery and discharge passages provide for uniform vertical loading of the louvers. Dry steam is fed from the discharge passages to a user.

The above-described vertical louver separator has a small specific surface of louvers per unit of volume of the separator due to the fact that large spaces take no part in the operation between the inner surface of the housing and the surface of the conical partition wall facing the inner surface of the housing, as well as between the surface of the conical partition wall extending along the axis of the housing and the housing. This results in that in steam power plants of large capacity operating in low pressure zones, that is with great volumetric flow rates and with the steam velocity at the entry to the louvers below the critical value to provide for efficient drying of steam, the separator is cumbersome and heavy, and has large steam spaces which is inadmissible for the safe operation of the turbine that may operate with an overspeed after the actuation of the cut-off valve.

It is an object of the invention to reduce the size of a separator, while retaining its throughput capacity and quality of separation, whereby the metal consumption for the construction of the separator is reduced and its cost is lowered.

In accordance with these and other objects of the invention a vertical separator is provided for separating liquid-gas media comprising a cylindrical housing accommodating a gas inlet and a gas discharge pipe, mounted coaxially with the housing, and defining, together with the inner surface of the housing, an annular space which is divided crosswise by a partition wall, having openings for gas passage, into a liquid-gas space accommodating blocks for separating the media into liquid and gas, and a gas space communicating with the internal space of the pipe. The separation blocks extend in the radial direction and are provided with a gas discharge means disposed in the spaces between adjacent separation blocks and the gas discharge means embrace the openings for gas passage in the partition wall.

This arrangement provides a separator that has an increased separating surface, due to the absence of large spaces that take no part in the operation, without increasing the separator volume.

The gas discharge means is preferably formed by the outlet wall of a separation block that faces the inlet side wall of an adjacent separation block, a quadrangular plate having one side fixed along its entire length to the top radial edge of the unit, and the opposite side fixed to the partition wall in a spaced relationship with respect to the inlet side wall of the adjacent separation block, sufficiently for draining the liquid, and a triangular plate facing the inner surface of the housing and having its shortest side fixed along its whole length to the partition wall, another side fixed along its entire length to the vertical edge of the outlet side wall to an adjacent separation block, and the third, the longest side fixed along its whole length to a third side of the quadrangular plate, whose fourth side is fixed along its whole length to another vertical edge of the outlet side wall.

This construction of the gas discharge means permits the obtaining of uniform vertical loading of the louvers since it divides the space between the adjacent separation blocks into a distributing manifold of one separation block and a collecting manifold of the other block, in which almost constant axial velocity and static pressure of the medium are maintained due to a varying cross-sectional area, as well as to ensure complete draining of the liquid to the partition wall.

The openings for gas passage in the partition wall are preferably made in the form of segments, each having one side adjoin the lower radial edge of the outlet side wall of the separation blocks, defining the gas discharge means, another one adjoins the shortest side of the quadrangular plate, and the third side adjoins the lower edge of the quadrangular plate.

This construction of the gas passage in the partition wall permits to provide the lowest possible aerodynamic resistance at the gas outlet from the separation blocks since almost the entire cross-sectional area available between the adjacent separation blocks is utilized for the gas outflow, that is the lowest possible outlet velocity of gas is obtained.

The partition wall is preferably made in the form of truncated cone with its smaller base embracing the gas discharge pipe and the larger base adjoining the inner surface of the housing.

This construction of the partition wall provides for complete and easy draining of the liquid under gravity along the inclined surface.

Other objects and advantages of the invention will be better understood from the following description of a specific exemplary embodiment thereof with reference to the accompanying drawings, in which:

FIG. 1 schematically shows a longitudinal section of the vertical separator according to the invention;

FIG. 6 is a sectional view taken along the line VI—VI in FIG. 3.

Figure 2:
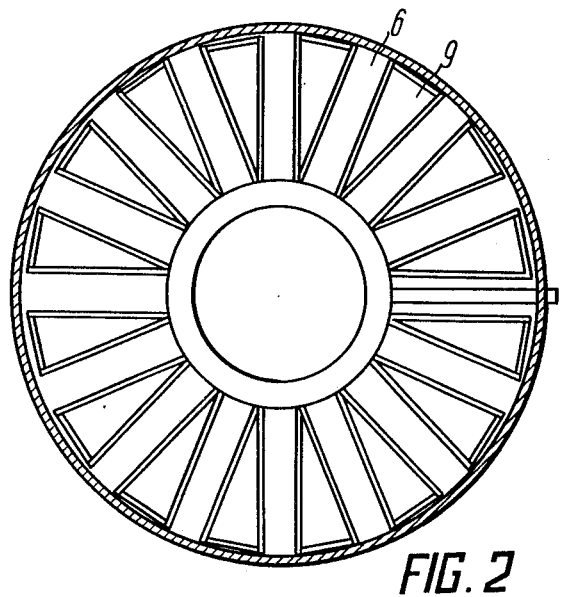
FIG. 2 is a sectional view taken along the line II—II in FIG. 1.

The vertical separator according to the invention, to be used for separation of liquid-gas media, such as wet steam, comprises a cylindrical housing 1 (FIG. 1) having a lateral inlet pipe 2 for admitting the wet steam. The housing 1 accommodates a pipe 3 coaxial therewith and terminating in an outlet pipe portion 4. The pipe 3 and the outlet pipe portion 4 serve for discharging dry steam (also referred to as "gas").

The pipe 3 and the inner surface of the housing 1 define an annular space 5 which is divided by means of a partition wall 6 into a wet steam space 7 and a dry steam space 8, the latter communicating with the internal space of the pipe 3.

The partition wall 6 is preferably made in the form of a truncated cone for complete and easy draining of the liquid under gravity along its inclined surface and has openings 9 (FIG. 2) for dry steam, the smaller base of the partition wall 6 preferably embracing the pipe 3, and the larger base adjoining the inner surface of the housing 1.

Figure 4:
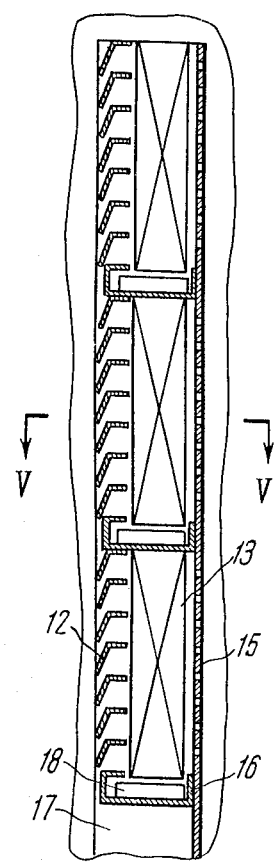
FIG. 4 is a sectional view taken along the line IV—IV in FIG. 3.
Figure 5:
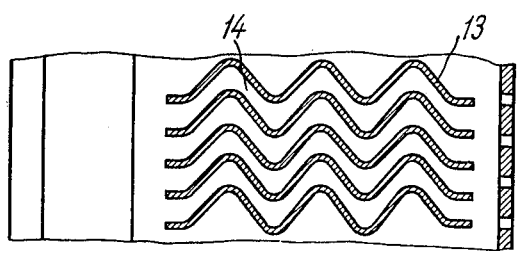
FIG. 5 is a sectional view taken along the line V—V in FIG. 4.

The space 7 accommodates identical separation blocks 10 (FIG. 1). The separation blocks 10 extend in the radial direction (see FIG. 3), and each block has a dry steam discharge means 11 accommodated in the space between the adjacent blocks 10 and embracing the openings 9 (FIG. 2) of the partition wall 6. This arrangement of the blocks 10 (FIG. 3) permits to obtain a larger separation surface, in the same volume of the separator, due to the absence of large spaces of the separator taking no part in the operation. The blocks 10, constituting a unit, comprises the following component parts: guide vanes 12 (FIG. 4), lauvers 13 defining steam passages 14 (FIG. 5), a perforated plate 15 (FIG. 4), draining troughs 16 and a draining column 17 with openings 18.

The guide vanes 12 serve for preliminary separation of mist and in addition, they provide together with the perforated plate 15 uniform vertical loading of the louvers 13. The latter are intended for final separation of mist, and the draining throughs 16 serve for collection of mist deposited on the louvers 13 and for draining it into the draining column 17 through the openings 18.

The dry steam or gas discharge means 11 (FIG. 3) is formed by the outlet side walls of the separation blocks 10 (FIG. 6) comprising the perforated plate 15 and facing the inlet side wall of the adjacent separation block 10, a triangular plate 19 and a twisted quadrangular plate 20. The triangular plate 19 is fixed along the entire length of the shortest side thereof to the partition wall 6, along the entire length of another side to the perforated plate 15 and along the entire length of yet another side; its longest side; to one side of the twisted quadrangular plate 20.

Figure 3:
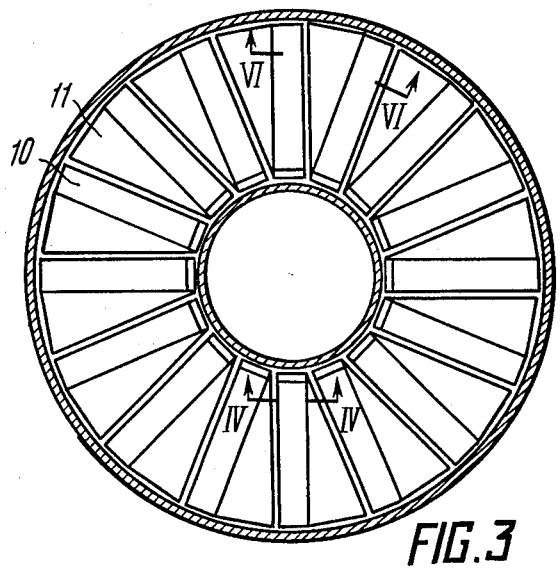
FIG. 3 is a sectional view taken along the line III—III in FIG. 1.

The opposite side of the quadrangular plate 20 is fixed along its entire length to the perforated plate 15. One side of the quadrangular plate 20 is fixed along its entire length to a top radial edge 21 of one of the separation blocks 10, and the fourth side is fixed along its entire length to the partition wall 6. Yet another side of the plate 20 is fixed to the partition wall 6 in a spaced relationship to inlet side wall of the adjacent separation block 10 (FIG. 6) sufficiently for draining the mist preliminarily separated on the vanes 12 (FIG. 4) and deposited on the walls of the housing 1 (FIG. 1), the pipe 3 and the dry steam discharge means 11 (FIG. 3).

With this the quadrangular plate 20 (FIG. 6) divides the space between two adjacent separation blocks 10 into a distributing manifold 22 of one separation block 10, and a collecting manifold 23 of the other separation block 10. Thus, almost constant axial velocity and static pressure of the medium are maintained in the distributing and collecting manifold 22, 23 due the the varying cross-sectional area, that is a uniform vertical loading of the louvers 13 of the separation block 10 is obtained.

The openings 9 for dry steam passage (FIG. 2) in the partition wall 6 are made in the form of a segments. Each segment has sides of which one adjoins the lower radial edge of an outlet side wall of the separation block 10 (FIG. 1) which comprises the perforated plate 15 (FIG. 4), another side that adjoins the shortest side of the triangular plate 19 (FIG. 6), and a third side that adjoins the lower edge of the twisted quadrangular plate 20.

With this construction of the opening 9 for dry steam passage (FIG. 2) almost the entire cross-sectional area available between the two adjacent separation blocks 10 (FIG. 1) is utilized for discharging the dry steam. This provides for the lowest possible aerodynamic resistance to the outflow of steam from the separation block due to the lowest possible outlet velocity of dry steam.

An annular collector 24 for collecting the deposited mist, having a pipe 25 for draining the mist, is provided in the pipe 3 below the partition wall 6.

The above-described vertical separator functions as follows. Wet steam flows along the inlet pipe 2 (FIG. 1) and is admitted to the wet steam space 7 of the annular space 5, wherefrom it flows into the distributing manifolds 22 (FIG. 6) of the separation blocks 10. In the distributing manifold 22, due to varying cross-sectional area along the height of the separation block 10, there are maintained almost constant axial velocity and static pressure of the wet steam. Then the steam is fed to the guide vanes 12 (FIG. 4) to change the flow direction from a vertical, from the top down, to a horizontal direction.

Thus up to 50% of mist contained in the wet steam is separated and flows down to the partition wall 6 (FIG. 1) and then into the annular collector 24. Then the steam is admitted to the louvers 13 (FIG. 4), wherein the final drying thereof occurs. The wet steam flows along the passages 14 (FIG. 5) in which mist is deposited on the walls of the louvers 13 (FIG. 4) due to repeated changes of the flow direction and flows down to the draining troughs 16 and then into the draining column 17 through the openings 18 and to the annular collector 24 (FIG. 1). The dry steam flows out through the orifices in the perforated plate 15 (FIG. 4) into the collecting manifold 23 (FIG. 6), in which it changes its flow direction from the horizontal to the vertical direction, from the top down.

In the collecting manifold, due to the varying cross-sectional area, there are maintained almost constant axial velocity and static pressure of the steam. Then the steam is admitted, through the openings 9 (FIG. 2) of the partition wall 6, to the dry steam space 8, and it is discharged from the separator there through the internal space of the pipe 3 and the outlet pipe 4. The mist collected in the annular collector 24 is also drained from the separator through the pipe 25.

What is claimed is:

1. A vertical separator for separating a liquid - gas medium, comprising: a cylindrical housing (1); a lateral inlet (2) for admitting the medium; a gas-discharge pipe (3) axially mounted within said housing; a substantially axial annular space (5) being defined between the inner surface of said housing and the outer surface of said pipe; a partition wall (6) dividing said annular space crosswise into a first space (7) for the medium, closer to said inlet, and a second space (8) for the gas, farther away from said inlet, and communicating with the internal space of said pipe; openings (9) in said partition wall for passage of the gas; blocks (10) disposed substantially axially in said first space and radially outward of said gas discharge pipe for separating the medium into the liquid and the gas, each of said blocks having an extension in the radial direction of said housing and each including an inlet side wall and an outlet side wall, each said inlet side wall comprising guide vanes (12) for the preliminary separation of the medium, said louvers (13) between said inlet and outlet side walls for the final separation of the medium, said louvers being mounted relative to each other in such a manner as to define gas passages (14); each said outlet wall comprising a perforated plate (15) providing uniform loading of said louvers; and gas discharge means (11) for said blocks, accommodated in spaces between adjacent blocks and embracing said openings for the gas passage.

2. The vertical separator as defined in claim 1, wherein said partition wall includes a truncated cone having its smaller base embracing said gas discharge pipe, and the larger base adjoining said inner surface of the housing.

3. The vertical separator as defined in claim 1, wherein said gas discharge means includes a substantially axial quadrangular plate (20) having one side fixed along its entire length to the top edge (21) of at least one of said blocks, extending radially relative to said housing, a second, opposite side fixed to said partition wall in a spaced relationship with respect to said inlet side wall of at least one of said adjacent blocks, sufficiently for draining the liquid; and a triangular plate (19) facing said inner surface of the housing and having a first, shortest side fixed along its entire length to said partition wall, a second, longest side fixed along its entire length to a third side of said quadrangular plate, and a third side fixed along its entire length to a vertical edge of said outlet side wall; said quadrangular plate having a fourth side fixed along its entire length to another vertical edge of said outlet side wall.

4. The vertical separator as defined in claim 1, wherein said openings for gas passage are made in the form of segments having their sides extend radially relative to said housing and forming said gas discharge means, one side of each segment adjoining the lower edge of said outlet side wall, another side of each segment adjoining said first side of the triangular plate, and a third side of said segment adjoining the lower edge of said quadrangular plate.

* * * * *